(12) United States Patent
Drennen et al.

(10) Patent No.: US 9,004,233 B2
(45) Date of Patent: Apr. 14, 2015

(54) COMBINED THRUST BEARING/LOAD CELL FOR BRAKE ACTUATORS

(71) Applicant: Goodrich Corporation, Charlotte, NC (US)

(72) Inventors: David Drennen, Bellbrook, OH (US); Kevin Rehfus, Troy, OH (US); Douglas Lee Simpson, Huber Heights, OH (US); Thomas Freshour, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 97 days.

(21) Appl. No.: 13/710,996

(22) Filed: Dec. 11, 2012

(65) Prior Publication Data

US 2014/0158474 A1   Jun. 12, 2014

(51) Int. Cl.
*B60T 17/22*   (2006.01)
*F16D 55/36*   (2006.01)
*F16C 17/04*   (2006.01)
*F16C 17/24*   (2006.01)
*F16D 121/24*  (2012.01)

(52) U.S. Cl.
CPC .......... *B60T 17/22* (2013.01); *F16D 55/36* (2013.01); *F16C 17/04* (2013.01); *F16C 17/24* (2013.01); *F16D 2121/24* (2013.01)

(58) Field of Classification Search
CPC .......... B60T 17/22; F16C 17/04; F16C 17/10; F16D 55/36

USPC .................. 188/1.11 E, 71.5, 156, 72.7, 72.8
See application file for complete search history.

(56) References Cited

U.S. PATENT DOCUMENTS

| 3,033,031 | A |   | 5/1962  | Gruber |
| 4,095,852 | A |   | 6/1978  | Schutz |
| 4,995,483 | A |   | 2/1991  | Moseley et al. |
| 7,497,131 | B2 | * | 3/2009  | Sentoku .................. 73/862.322 |
| 7,565,953 | B2 | * | 7/2009  | Dalton et al. ............ 188/1.11 R |
| 2009/0324152 | A1 | * | 12/2009 | Ozaki et al. .................... 384/448 |
| 2011/0209562 | A1 | * | 9/2011  | Ono et al. ................ 73/862.045 |

FOREIGN PATENT DOCUMENTS

DE       10136438  A1     3/2002

OTHER PUBLICATIONS

Extended European Search Report for EP 13195807.6, Mar. 18, 2014.

* cited by examiner

*Primary Examiner* — Anna Momper
(74) *Attorney, Agent, or Firm* — Kinney & Lange, P.A.

(57) ABSTRACT

A ring-shaped thrust bearing extending in an axial direction having an inner surface includes a first axial groove in the inner surface having a first flat wall and a second flat wall; and a first principal strain sensor positioned on the first flat wall of the first axial groove to measure compression in the axial direction.

18 Claims, 6 Drawing Sheets

COMBINED THRUST BEARING/LOAD CELL FOR BRAKE ACTUATORS

BACKGROUND

The present invention is related to electromechanical brake systems, and in particular to combined thrust bearing/load cells for electric brake actuators.

Electromechanical brakes for aircraft comprise stator discs and rotor discs. The stator discs are coupled to an axle and do not rotate relative to the axle. The rotor discs are coupled to, and rotate with the wheel, relative to the axle. An electric brake actuator is utilized to apply force to all of the stator discs, which in series, compress the stator portion with the rotor portion of the brake. This creates friction that slows the rotation of the wheel, converting kinetic energy into thermal energy. In order to better control the actuator, it is desirable to know the real/non-estimated force that is being applied to the stator disc by the actuator.

Load cells in electric brakes are often used to determine strains experienced by the actuator when applying force to the stator discs. These actuators are sometimes circular in shape and thus, measuring devices placed in the reactionary load path to measure axial compression will experience bending and hoop stresses, which can cause measurement inaccuracies. Load cells, being in the direct load path, take up space within the actuator, increasing the weight, and requiring a greater axial length of the actuator itself. It is desirable to reduce the bending and hoop stresses experienced by the measuring devices implemented on circular load cells while also reducing weight and space taken up by a load cell within the actuator.

SUMMARY

A ring-shaped thrust bearing extends in an axial direction and has an inner surface that includes an axial groove and a principal strain sensor. The axial groove is in the inner surface and includes a first flat wall and a second flat wall. The principal strain sensor is positioned on the first flat wall of the axial groove to measure compression in the axial direction.

DETAILED DESCRIPTION

The present invention relates to reducing measurement inaccuracy and reducing the size and weight of electric brake actuators. An electric brake actuator is used to apply a force to a stator portion of a brake in order to compress the stator portion with the rotor portion of the brake. This creates friction to slow down the rotation of the wheel. Strain sensors are implemented to measure the resultant load on the electric actuator. These strain sensors are placed in slots cut out of a thrust bearing inner race of the actuator. The thrust bearing is a multiple row rotary bearing that can handle the high axial load of the actuator. The load is transmitted from the ram of the actuator back to the thrust bearing and into the housing of the actuator. This load is measured by the strain sensors on the thrust bearing inner race. Grooves are cut out of the inner surface of the thrust bearing inner race every ninety degrees circumferentially around the thrust bearing. The grooves each contain two side walls and a flat surface between the two side walls. The principal strain sensors are positioned along the flat surface between the two side walls and oriented to measure force in the axial direction. The transverse sensors are placed vertically upon one of the two side walls, perpendicular to the principal sensors. The eight strain sensors are electrically connected in a wheatstone bridge configuration. The wheatstone bridge is connected to a data acquisition module. By placing the strain sensors on the flat surfaces of the grooves, the traditional bending and hoop stresses experienced on the outer diameter of the circular load cell are eliminated. By implementing the strain sensors on the thrust bearing inner race, the need for a separate load cell is eliminated, allowing for a reduced axial length and lower weight of the actuator.

Figure 1:
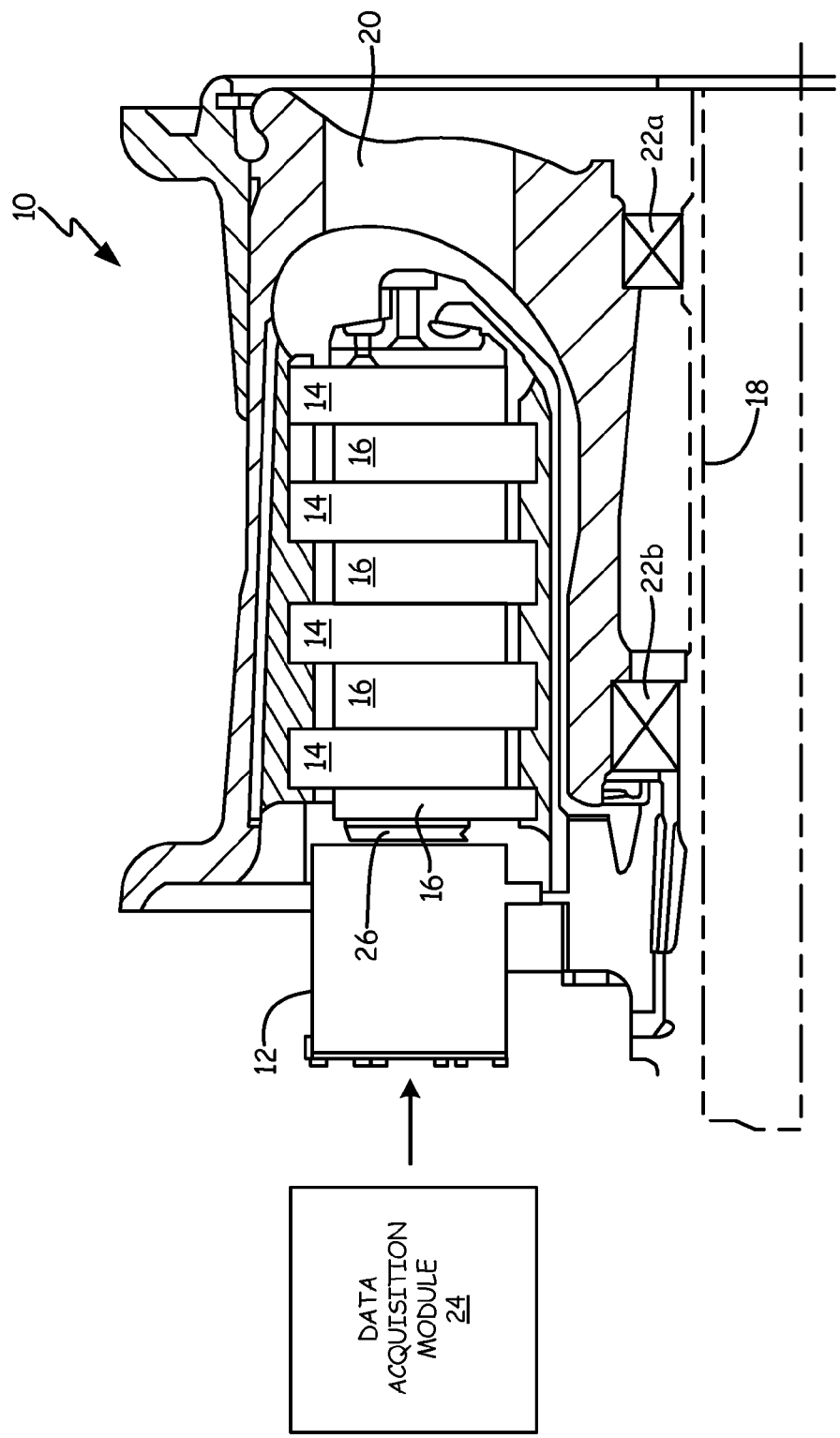
FIG. 1 is a cross-section view illustrating an electromechanical brake system.

FIG. 1 illustrates an electromechanical brake system 10, which includes electric brake actuator 12, rotor discs 14, stator discs 16, axle 18, wheel 20, bearings 22a and 22b, and data acquisition module 24. Electric brake actuator 12 includes ram 26. Wheel 20 rotates about axle 18 on bearings 22a and 22b. Electric brake actuator 12 is utilized to apply a force to the closest of stator discs 16. Stator discs 16 are coupled to, and do not rotate relative to axle 18. Rotor discs 14 are coupled to, and rotate with wheel 20. When force is applied by ram 26 of electric actuator 12 to stator discs 16, friction is generated between stator discs 16 and rotor discs 14, which slows the rotation of wheel 20, converting kinetic energy to thermal energy. Electric brake actuator 12 electrically measures and communicates the load it experiences to data acquisition module 24 for closed loop brake control. Data acquisition module 24 is any module capable of receiving and storing electronic signals from electric brake actuator 12.

Figure 2:
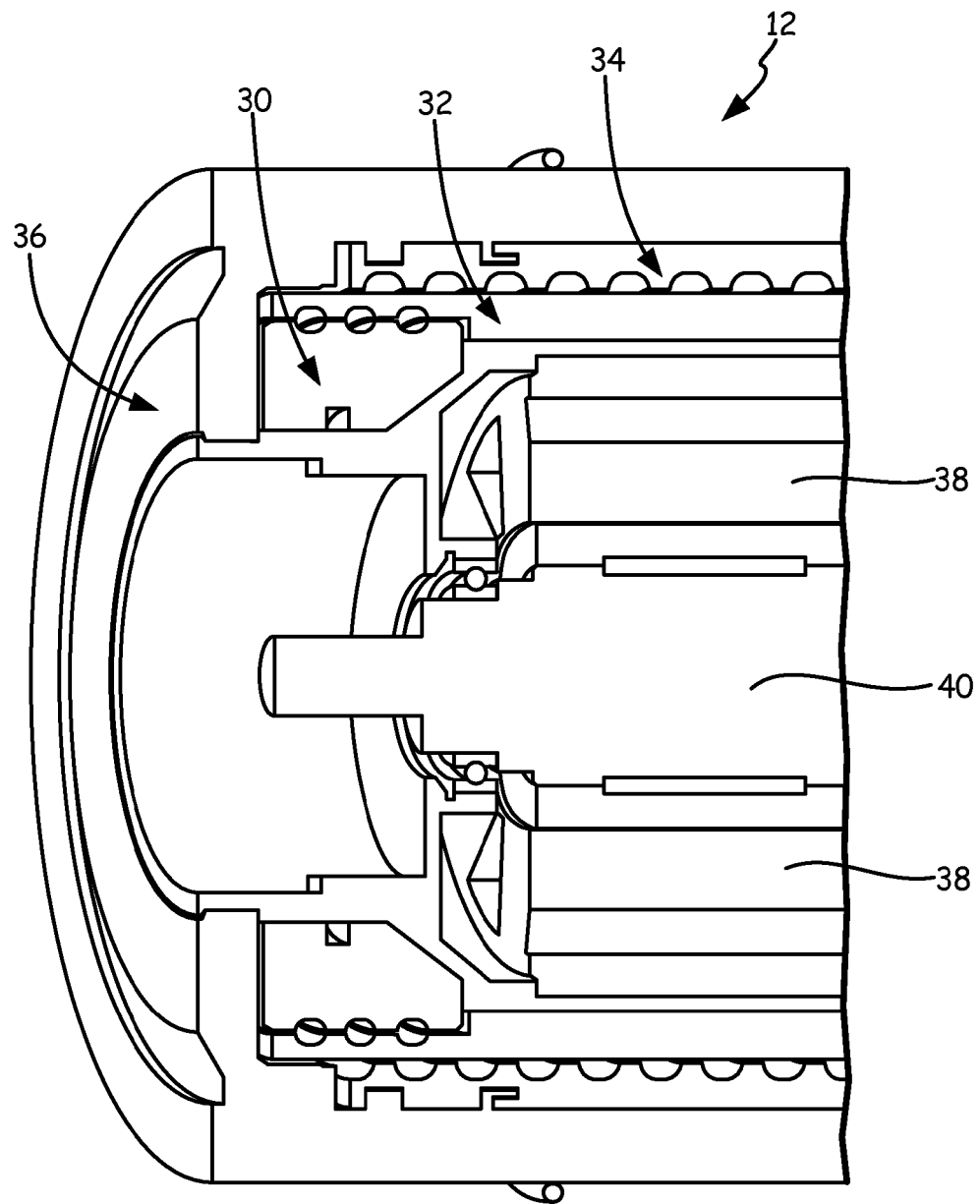
FIG. 2 is a cross-section view illustrating an electric brake actuator for an electromechanical brake system.

FIG. 2 illustrates electric brake actuator 12, which includes thrust bearing inner race 30, outer race/screw 32, nut 34, housing 36, and a motor that includes motor windings 38 and motor shaft 40. Outer race/screw 32 acts as part of the thrust bearing and as part of a ball screw assembly. Outer race/screw 32 rotates relative to inner race 30 on ball bearings. The motor rotates outer race/screw 32 which translates nut 34 of the ball screw assembly axially. This extends ram 26 (FIG. 1) into the brake stack. The reaction force translates back into outer race/screw 32 which loads thrust bearing inner race 30. Thrust bearing inner race 30 is strained as the load is transmitted to housing 36. Strain sensors are implemented on thrust bearing inner race 30 to create an electrical voltage that can be trimmed to determine the load that is present on electric brake actuator 12. While illustrated as a three-row thrust ball bearing, any type of thrust bearing with any number of rows may be implemented in electric brake actuator 12.

Figure 3A:
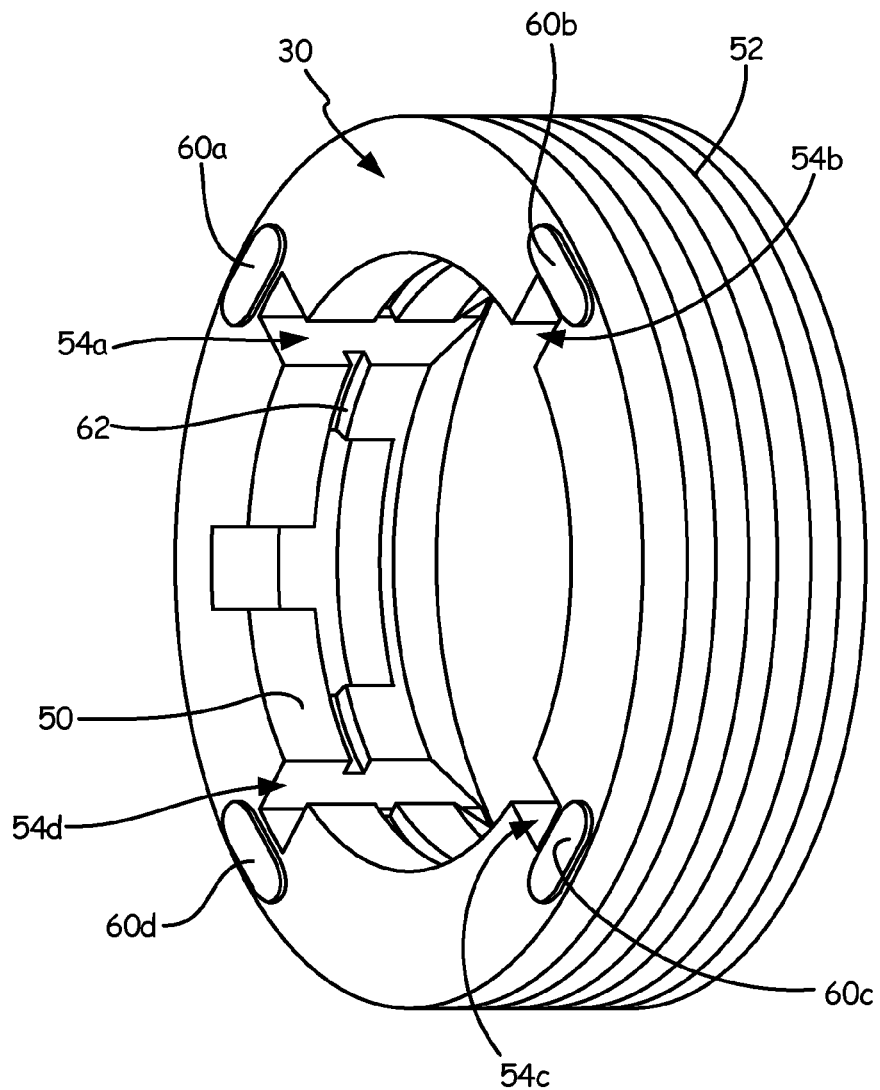
FIGS. 3A and 3B schematically illustrate a combined thrust bearing/load cell for an electric brake actuator.
Figure 3B:
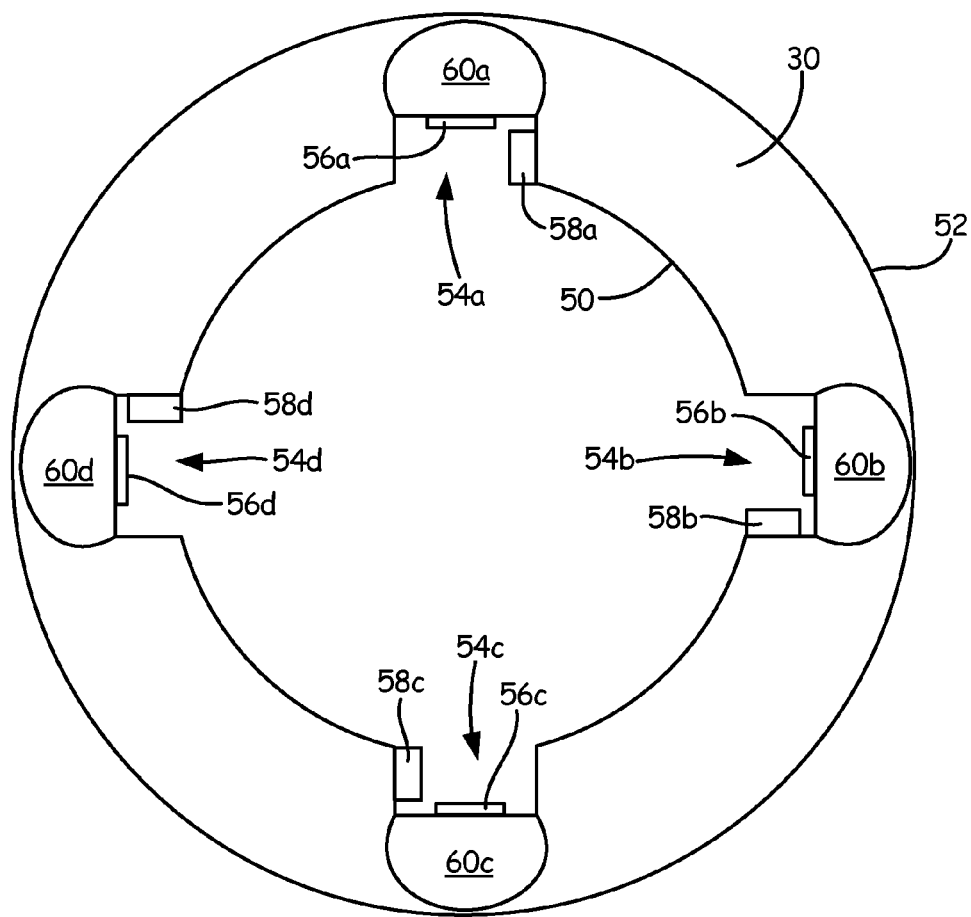

FIGS. 3A and 3B schematically illustrate thrust bearing inner race 30 of an electric brake actuator. Inner race 30 is part of a rotary bearing that can support a high axial load created when ram 26 (FIG. 1) of electric brake actuator 12 is extended to apply a force to one of stator discs 16 (FIG. 1). Thrust bearing inner race 30 includes inner surface 50, outer surface/raceway 52, grooves 54a-54d. Each groove 54a-54d includes principal strain sensors 56a-56d, and transverse strain sensors 58a-58d. Connected to each principal strain sensor 56a-56d is a pad 60a-60d respectively. Inner surface 50 also includes a groove 62 that holds wires that connect principal strain sensors 56a-56d and transverse strain sensors 58a-58d with one another.

Thrust bearing inner race 30 includes inner surface 50, for example, in order to better fit within electric brake actuator 12 of FIGS. 1 and 2. The difference in diameter between inner surface 50 and outer surface 52 is any difference necessary to accommodate thrust bearing inner race 30 within electric brake actuator 12 or any other application such as, for example, one half inch (1.77 centimeters). The depth of each groove 54a-54d is any depth between inner surface 50 and outer surface 52 such as, for example, one-quarter inch (0.885 centimeters).

Figure 4:
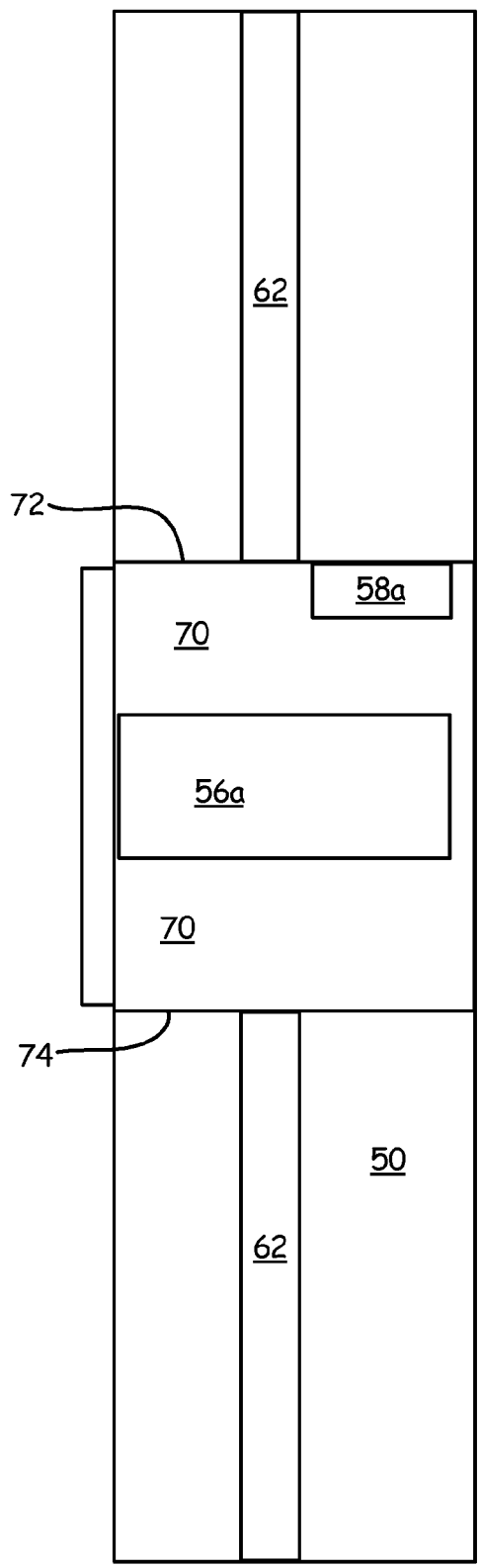
FIG. 4 is a top view of a groove of a combined thrust bearing/load cell.

FIG. 4 illustrates a top view of inner surface 50 of thrust bearing inner race 30. Groove 54a includes base 70, side walls 72 and 74, principal sensor 56a, transverse sensor 58a, pad 60a, and is connected to circumferential wire groove 62 in inner surface 50 of thrust bearing 30. Groove 54a, principal sensor 56a, transverse sensor 58a, and pad 60a are representative of each of grooves 54a-54d, principal strain sensors 56a-56d, transverse strain sensors 58a-58d and pads 60a-60d of FIGS. 3A and 3B, respectively.

Principal sensor 56a is utilized to measure the axial compression of thrust bearing 30. Principal sensor 56a is any electric strain sensor such as, for example, a general purpose strain gage. Pad 60a is connected to principal sensor 56a to help provide the axial load of thrust bearing inner race 30 to principal sensor 56a.

Transverse sensor 58a is used to compensate for temperature changes and other unexpected stresses upon principal sensor 56a. Transverse sensor 58a is mounted to side wall 72 and is positioned perpendicular to principal sensor 56a. This is so transverse sensor 78a does not measure any of the axial compression of thrust bearing 30. Transverse sensor 58a may also be, for example, mounted to side wall 74.

Figure 5:
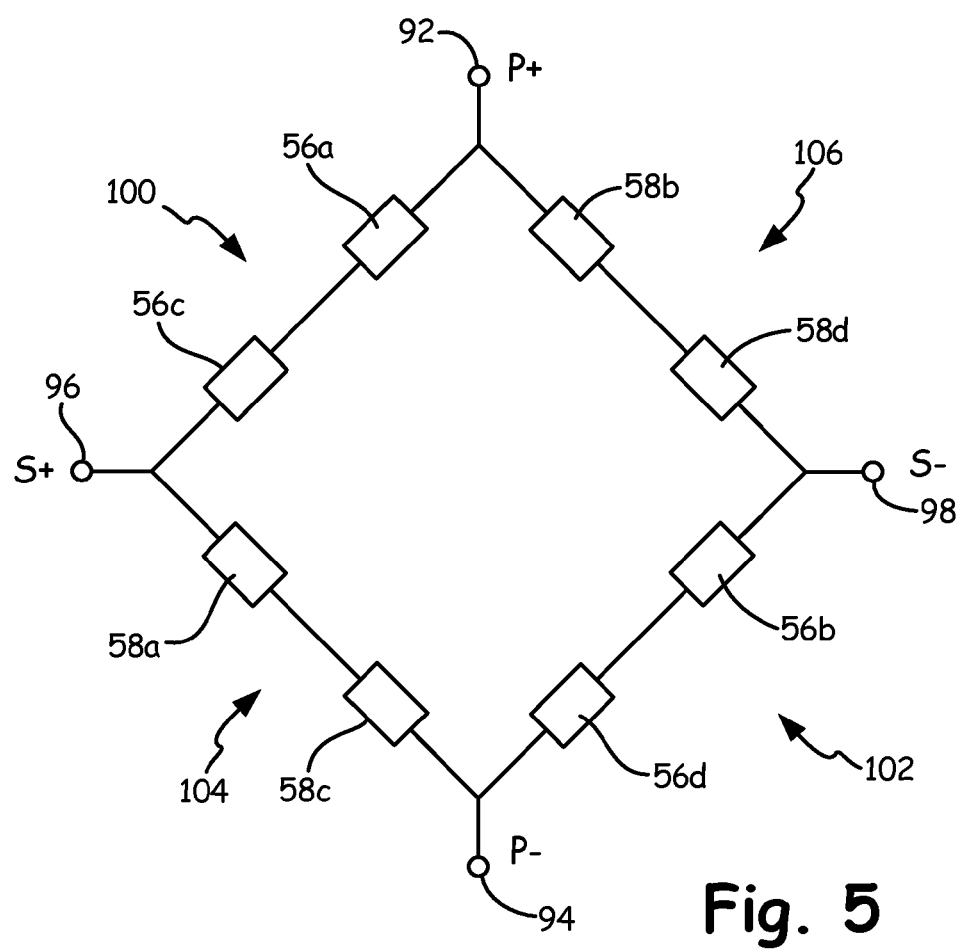
FIG. 5 is a circuit diagram illustrating a strain sensor configuration.

FIG. 5 is a circuit diagram illustrating a bridge circuit 90 according to an embodiment of the present invention. Bridge circuit 90 includes positive power terminal 92, negative power terminal 94, positive signal terminal 96, and negative signal terminal 98. The locations of principal sensors 56a-56d and transverse sensors 58a-58d of FIG. 3 are shown in bridge circuit 90.

Bridge 90 is a wheatstone bridge with two legs 100 and 102 having principal sensors and two legs 104 and 106 having transverse sensors. Power is provided to the strain sensors through positive signal terminal 96. When a load is experienced by electric actuator 12, the resistances of principal sensors 56a-56d change, creating an electric potential across signal terminals 96 and 98. When no load is experienced, the potential at both signal terminals 96 and 98 are equal, creating no voltage across the terminals. This signal is representative of the axial stress on load cell 30 and may be trimmed or provided as is to data acquisition module 24 of FIG. 1. This signal does not change with temperature or other unexpected stresses due to the configuration of transverse strain sensors 58a-58d because the temperature change or stress will affect the resistances of all strain sensors 56a-56d and 58a-58d equally.

The following are non-exclusive descriptions of possible embodiments of the present invention.

A ring-shaped thrust bearing extending in an axial direction has an inner surface and includes, among other things: a first axial groove in the inner surface having a first flat wall and a second flat wall, and a first principal strain sensor positioned on the first flat wall of the first axial groove to measure compression in the axial direction.

The thrust bearing of the preceding paragraph can optionally include, additionally and/or alternatively, any one or more of the following features, configurations and/or additional components.

A first transverse strain sensor is positioned on the second flat wall of the first axial groove perpendicular to the first principal strain sensor.

The thrust bearing is included within an electric brake actuator of an aircraft landing gear.

A pad is positioned between the first flat wall of the first axial groove and an outer surface of the thrust bearing, wherein the pad is connected to the first principal strain sensor.

A second axial groove in the inner surface has a first flat wall, and a second flat wall, a second principal strain sensor is positioned on the first flat wall of the second axial groove to measure compression in the axial direction, a third axial groove in the inner surface has a first flat wall, and a second flat wall, a third principal strain sensor is positioned on the first flat wall of the third axial groove to measure compression in the axial direction, a fourth axial groove in the inner surface has a first flat wall, and a second flat wall, and a fourth principal strain sensor is positioned on the first flat wall of the fourth axial groove to measure compression in the axial direction.

The first axial groove, the second axial groove, the third axial groove, and the fourth axial groove are circumferentially spaced 90° apart around the inner diameter.

A first transverse strain sensor is positioned on the second flat wall of the first axial groove perpendicular to the first principal strain sensor, a second transverse strain sensor positioned on the second flat wall of the second axial groove perpendicular to the second principal strain sensor, a third transverse strain sensor is positioned on the second flat wall of the third axial groove perpendicular to the third principal strain sensor, a fourth transverse strain sensor is positioned on the second flat wall of the fourth axial groove perpendicular to the fourth principal strain sensor.

The first, second, third and fourth principal strain sensors and the first, second, third, and fourth transverse strain sensors are configured in a wheatstone bridge with a power input, and a signal output.

The wheatstone bridge includes a first leg that includes the first and second principal strain sensors, a second leg that includes the first and second transverse strain sensors, a third leg that includes the third and fourth principal strain sensors, a fourth leg that includes the third and fourth transverse strain sensors.

The signal output is connected to a data acquisition module that calculates the load of the electric actuator based upon the signal output.

A circumferential groove in the inner diameter holds wires for connecting the first, second, third and fourth principal strain sensors.

A system includes, among other things: an actuator that applies force to a brake stack of an electromechanical brake, a thrust bearing ring located within the actuator and having an inner race with an inner surface, and a first axial groove in the inner surface, and a first principal strain sensor mounted in the first axial groove.

The system of the preceding paragraph can optionally include, additionally and/or alternatively, any one or more of the following features, configurations and/or additional components.

A first transverse strain sensor is mounted in the first axial groove.

A pad is positioned between the first axial groove and the outer surface of the thrust bearing, wherein the pad is connected to the first principal strain sensor.

The thrust bearing ring further comprises a second axial groove in the inner surface, a third axial groove in the inner surface, and a fourth axial groove in the inner surface.

A second principal strain sensor is mounted in the second axial groove, a third principal strain sensor is mounted in the third axial groove, and a fourth principal strain sensor is mounted in the fourth axial groove.

The first, second, third, and fourth axial grooves are circumferentially spaced 90° apart around the inner surface.

A first transverse strain sensor is mounted in the first axial groove perpendicular to the first principal strain sensor, a second transverse strain sensor is mounted in the second axial groove perpendicular to the second principal strain sensor, a third transverse strain sensor is mounted in the third axial groove perpendicular to the third principal strain sensor, and a fourth transverse strain sensor is mounted in the fourth axial groove perpendicular to the fourth principal strain sensor.

The first, second, third, and fourth principal strain sensors and the first, second, third, and fourth transverse strain sensors are configured in a wheatstone bridge with a power input, and a signal output.

The wheatstone bridge includes a first leg that includes the first and second principal strain sensors, a second leg that includes the first and second transverse strain sensors, a third leg that includes the third and fourth principal strain sensors, and a fourth leg that includes the third and fourth transverse strain sensors.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A ring-shaped thrust bearing extending in an axial direction, the thrust bearing comprising:
    a radially inner surface;
    a first axial groove in the inner surface, the first axial groove having a first flat wall and a second flat wall perpendicular to the first flat wall;
    a first principal strain sensor positioned on the first flat wall of the first axial groove to measure compression in the axial direction; and
    a first transverse strain sensor positioned on the second flat wall of the first axial groove perpendicular to the first principal strain sensor.

2. The thrust bearing of claim 1, wherein the thrust bearing is included within an electric brake actuator of an aircraft landing gear.

3. The thrust bearing of claim 1, further comprising:
    a pad positioned between the first flat wall of the first axial groove and an outer surface of the thrust bearing, wherein the pad is connected to the first principal strain sensor.

4. The thrust bearing of claim 1, further comprising:
    a second axial groove in the inner surface having a first flat wall, and a second flat wall;
    a second principal strain sensor positioned on the first flat wall of the second axial groove to measure compression in the axial direction;
    a third axial groove in the inner surface having a first flat wall, and a second flat wall;
    a third principal strain sensor positioned on the first flat wall of the third axial groove to measure compression in the axial direction;
    a fourth axial groove in the inner surface having a first flat wall, and a second flat wall; and
    a fourth principal strain sensor positioned on the first flat wall of the fourth axial groove to measure compression in the axial direction.

5. The thrust bearing of claim 4, wherein the first axial groove, the second axial groove, the third axial groove, and the fourth axial groove are circumferentially spaced 90° apart around the inner diameter.

6. The thrust bearing of claim 4, further comprising:
    the first transverse strain sensor positioned on the second flat wall of the first axial groove perpendicular to the first principal strain sensor;
    a second transverse strain sensor positioned on the second flat wall of the second axial groove perpendicular to the second principal strain sensor;
    a third transverse strain sensor positioned on the second flat wall of the third axial groove perpendicular to the third principal strain sensor; and
    a fourth transverse strain sensor positioned on the second flat wall of the fourth axial groove perpendicular to the fourth principal strain sensor.

7. The thrust bearing of claim 6, wherein the first, second, third and fourth principal strain sensors and the first, second, third, and fourth transverse strain sensors are configured in a wheatstone bridge with a power input, and a signal output.

8. The thrust bearing of claim 7, wherein the wheatstone bridge comprises:
    a first leg that includes the first and second principal strain sensors;
    a second leg that includes the first and second transverse strain sensors;
    a third leg that includes the third and fourth principal strain sensors; and
    a fourth leg that includes the third and fourth transverse strain sensors.

9. The thrust bearing of claim 7, wherein the signal output is connected to a data acquisition module that calculates the load of the electric actuator based upon the signal output.

10. The thrust bearing of claim 4, further comprising a circumferential groove in the inner diameter that holds wires for connecting the first, second, third and fourth principal strain sensors.

11. A system comprising:
    an actuator that applies force to a brake stack of an electromechanical brake;
    a thrust bearing ring located within the actuator and having an inner race with a radially inner surface, and a first axial groove in the inner surface;
    a first principal strain sensor mounted on a first wall of the first axial groove; and
    a first transverse strain sensor mounted on a second wall of the first axial groove, wherein the second wall is perpendicular to the first wall.

12. The system of claim 11, further comprising:
    a pad positioned between the first axial groove and an outer surface of the inner race of the thrust bearing, wherein the pad is connected to the first principal strain sensor.

13. The system of claim 11, wherein the thrust bearing ring further comprises a second axial groove in the inner surface, a third axial groove in the inner surface, and a fourth axial groove in the inner surface.

14. The system of claim 13, further comprising:
   a second principal strain sensor mounted in the second axial groove;
   a third principal strain sensor mounted in the third axial groove; and
   a fourth principal strain sensor mounted in the fourth axial groove.

15. The system of claim 14, wherein the first, second, third, and fourth axial grooves are circumferentially spaced 90° apart around the inner surface.

16. The system of claim 14, further comprising:
   the first transverse strain sensor mounted in the first axial groove perpendicular to the first principal strain sensor;
   a second transverse strain sensor mounted in the second axial groove perpendicular to the second principal strain sensor;
   a third transverse strain sensor mounted in the third axial groove perpendicular to the third principal strain sensor; and
   a fourth transverse strain sensor mounted in the fourth axial groove perpendicular to the fourth principal strain sensor.

17. The system of claim 16, wherein the first, second, third, and fourth principal strain sensors and the first, second, third, and fourth transverse strain sensors are configured in a wheatstone bridge with a power input, and a signal output.

18. The system of claim 17, wherein the wheatstone bridge comprises:
   a first leg that includes the first and second principal strain sensors;
   a second leg that includes the first and second transverse strain sensors;
   a third leg that includes the third and fourth principal strain sensors; and
   a fourth leg that includes the third and fourth transverse strain sensors.

* * * * *